United States Patent
Watanabe

(10) Patent No.: US 10,997,711 B2
(45) Date of Patent: May 4, 2021

(54) APPEARANCE INSPECTION DEVICE

(71) Applicant: FANUC Corporation, Yamanashi (JP)

(72) Inventor: Keisuke Watanabe, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 261 days.

(21) Appl. No.: 16/175,837

(22) Filed: Oct. 31, 2018

(65) Prior Publication Data
US 2019/0156474 A1 May 23, 2019

(30) Foreign Application Priority Data
Nov. 17, 2017 (JP) .............................. JP2017-222176

(51) Int. Cl.
G06T 7/00 (2017.01)

(52) U.S. Cl.
CPC ............ *G06T 7/001* (2013.01); *G06T 7/0004* (2013.01); *G06T 7/97* (2017.01); *G06T 2207/20081* (2013.01); *G06T 2207/20084* (2013.01)

(58) Field of Classification Search
CPC ......... G06N 20/00; G06T 7/97; G06T 7/0004; G06T 7/001
See application file for complete search history.

(56) References Cited

U.S. PATENT DOCUMENTS

| 5,963,662 | A | 10/1999 | Vachtsevanos et al. |
| 2014/0314302 | A1 | 10/2014 | Minato et al. |
| 2015/0363925 | A1* | 12/2015 | Shibuya ............ F01D 25/00 345/440 |
| 2016/0210535 | A1 | 7/2016 | Takimoto |
| 2019/0095946 | A1* | 3/2019 | Azout ............... G06N 20/00 |

FOREIGN PATENT DOCUMENTS

| JP | 2005-52926 A | 3/2005 |
| JP | 2012-26982 A | 2/2012 |
| JP | 2013-140090 A | 7/2013 |
| JP | 2015-21756 A | 2/2015 |
| JP | 2016-133895 A | 7/2016 |
| WO | 2014/208257 A1 | 12/2014 |
| WO | WO-2017151757 A1 * | 9/2017 ........... G06N 3/0445 |

OTHER PUBLICATIONS

Office Action for Japanese Patent Application No. 2017-222176, dated Mar. 17, 2020, 6pp.

(Continued)

*Primary Examiner* — Myron Wyche
(74) *Attorney, Agent, or Firm* — Hauptman Ham, LLP

(57) ABSTRACT

An appearance inspection device creates a combination of a first image which is a normal product image and a second image which is a product image as a comparison object, on the basis of a reference data set and a learning data set, and a machine learning device learns classification of a product corresponding to the second image as normal or not normal for the combination. The machine learning device observes the combination of the first image and the second image as a state variable representing a current state of an environment, acquires a label given to the second image as label data, and performs learning by associating the state variable with the label data.

9 Claims, 10 Drawing Sheets

(56) References Cited

OTHER PUBLICATIONS

Tsubasa Kittaka, "Application of machine learning technology to industrial image processing applications: Machine learning function and deep learning utilization function provided by HALCON (Special feature: Utilization of Deep Learning in the image field) Machine learning for machine vision application", vol. 28 No. 2, Feb. 10, 2017, pp. 70-75, Japan Industrial Publishing Co., Ltd., 8pp.
Satoshi Chabata, "Exploring the present state of deep learning Image analysis software "ViDi Suite" using deep learning that changes conventional concepts", Eizojoho Industrial, vol. 49 No. 2, Feb. 1, 2017, pp. 6-11, Sangyo Kaihatsukiko Inc., 5pp.
Office Action in JP Application No. 2017-222176, dated Jul. 30, 2019, 3pp.

* cited by examiner

FIG.3
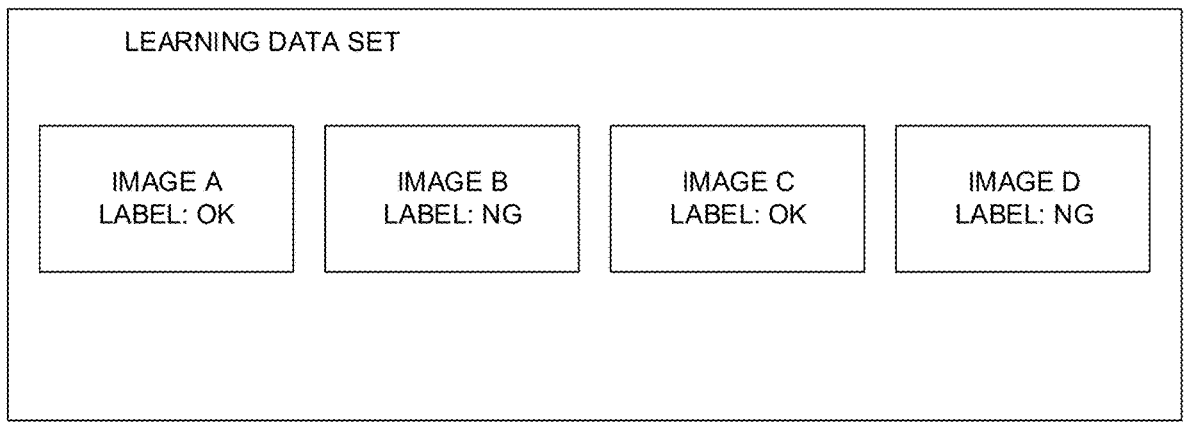
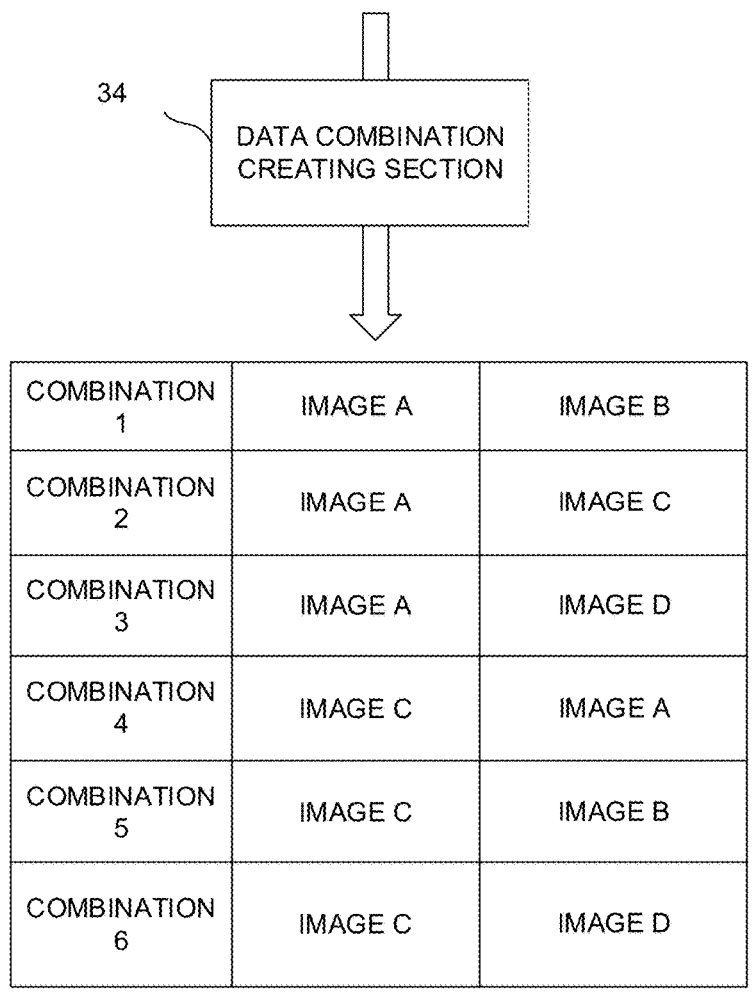

FIG.4

| REFERENCE DATA SET | | LEARNING DATA SET | |
|---|---|---|---|
| IMAGE A LABEL: OK | IMAGE B LABEL: NG | IMAGE P LABEL: OK | IMAGE Q LABEL: NG |
| IMAGE C LABEL: OK | IMAGE D LABEL: NG | IMAGE R LABEL: NG | |

34 DATA COMBINATION CREATING SECTION

| COMBINATION 1 | IMAGE A | IMAGE P |
|---|---|---|
| COMBINATION 2 | IMAGE A | IMAGE Q |
| COMBINATION 3 | IMAGE A | IMAGE R |
| COMBINATION 4 | IMAGE C | IMAGE P |
| COMBINATION 5 | IMAGE C | IMAGE Q |
| COMBINATION 6 | IMAGE C | IMAGE R |
| COMBINATION 7 | IMAGE P | IMAGE A |
| COMBINATION 8 | IMAGE P | IMAGE B |
| COMBINATION 9 | IMAGE P | IMAGE C |
| COMBINATION 10 | IMAGE P | IMAGE D |
| COMBINATION 11 | IMAGE P | IMAGE Q |
| COMBINATION 12 | IMAGE P | IMAGE R |

FIG.10
(1) FIRST LEARNING
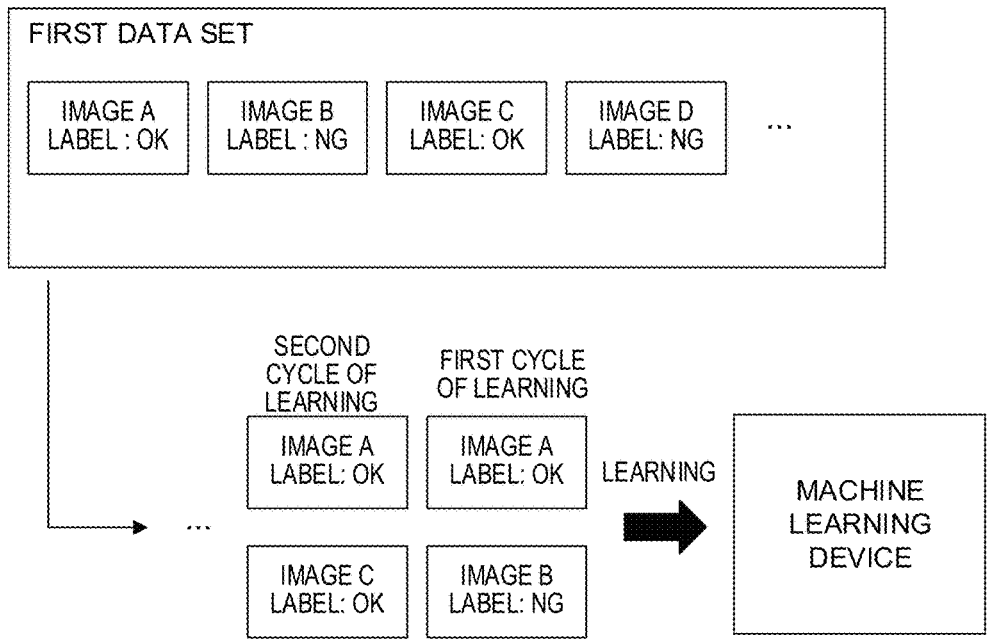
(2) ADDITIONAL LEARNING
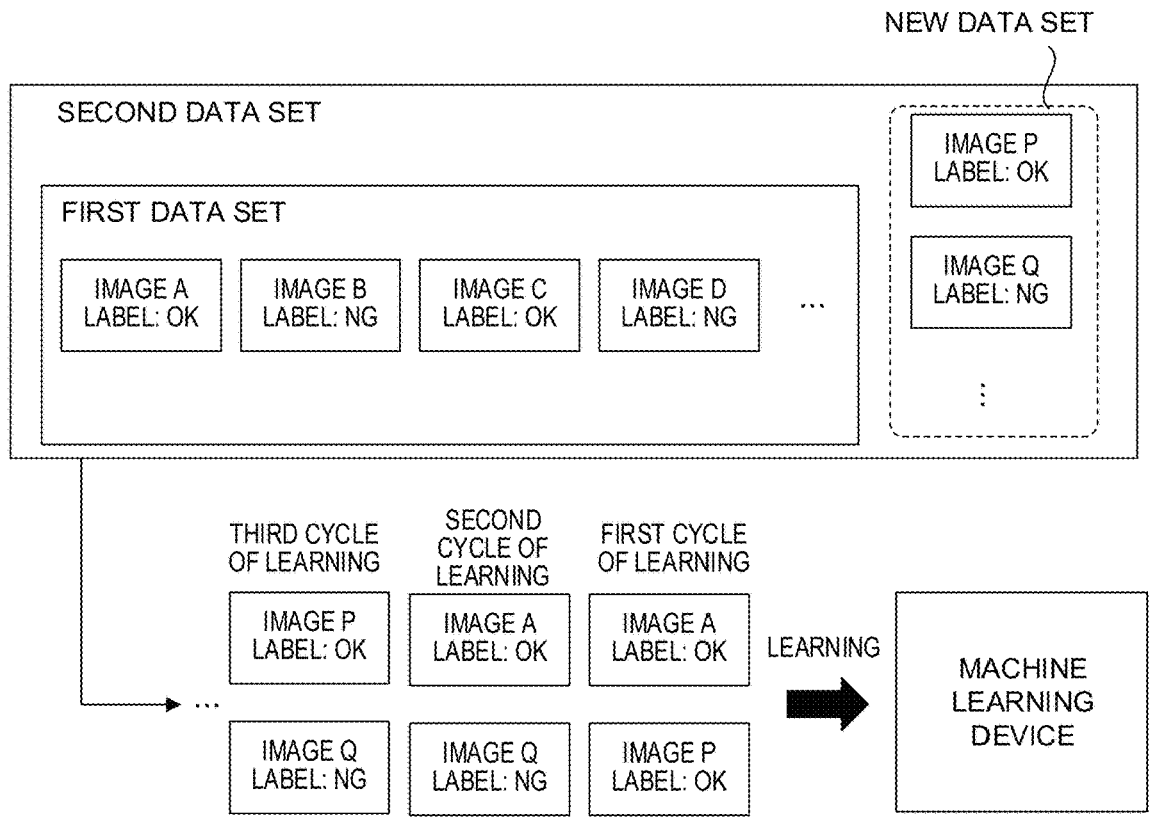

APPEARANCE INSPECTION DEVICE

RELATED APPLICATIONS

The present application claims priority of Japanese Application Number 2017-222176, filed on Nov. 17, 2017, the disclosure of which is hereby incorporated by reference herein in its entirety.

BACKGROUND OF THE INVENTION

1. Field of the Invention

The present invention relates to an appearance inspection device.

2. Description of the Related Art

Images of the appearances of products manufactured in a factory have been picked up with image pickup means, and product sorting work, appearance inspection involving classifying each product as a normal product or a defective product with, for example, a flaw or a chip, or the like which is based on the picked-up images have been performed (see, for example, Japanese Patent Application Laid-Open No. 2015-021756, Japanese Patent Application Laid-Open No. 2005-052926, and Japanese Patent Application Laid-Open No. 2013-140090). In the work or inspection, for example, feature points are extracted from a reference image prepared in advance, and sorting or screening of products is performed on the basis of a result of comparing the extracted feature points with feature points extracted from a picked-up image of each product.

Meanwhile, prior art techniques for making a classification on the basis of a feature appearing in an image include one which uses deep-neural-network-based deep learning. The technique performs work called annotation that attaches information (a label) on an object appearing in an image to the image (for example, attaches "product A" to an image showing product A and attaches "product B" to an image showing product B) to cause a neural network for deep learning to learn. Learning is executed using a thus created data set with images and labels, and an estimation is made on an image using a produced neural network, thereby classifying an object appearing in the image.

Generally, learning by a neural network for classifying an object appearing in an image requires an enormous number of images and man-hours for making annotations on all the images. Further, for example, in a case where an image of product C is input to a neural network which has learned to classify product A and product B, an estimation is not correctly made on an image in a class non-existent at the time of the learning, of course. For this reason, an attempt to apply image classification based on deep learning to appearance inspection at a manufacturing site faces various problems.

For example, since a manufacturing process in a factory is basically adjusted so as not to manufacture defective products, the number of samples of a defective product is small. As a result, before images, the number of which is required for learning, are collected, the shape of an inspection object may be changed due to a model change or the like. Defects come in various defect modes different in feature. If an unprecedented defect mode appears, correct inspection may not be performed using an existing neural network. Since a technique for learning differences between a normal product and a defective product with the above-described situation in mind is known, the idea of introducing the technique in advance and, when a new defect mode is found, handling the new defect mode by relearning is also conceivable. However, restarting such learning from the beginning takes too much time, and a conventional deep-learning learning method has not been suitable for appearance inspection.

SUMMARY OF THE INVENTION

Under the above-described circumstances, an object of the present invention is to provide an appearance inspection device capable of flexibly handling the shape of an inspection object or a new defect mode.

An appearance inspection device which performs appearance inspection of a product according to the present invention is premised on use of a machine learning device which simultaneously receives input images of two inspected products and performs learning, as depicted in FIG. 9. In the learning by the machine learning device, the machine learning device is made to learn to output information indicating a normal product if feature quantities of images of two (different) normal products are input and output information indicating a defective product if a feature quantity of an image of a normal product and a feature quantity of an image of a defective product are input.

As depicted in FIG. 10, in the appearance inspection device according to the present invention, as many picked-up images of inspected products as possible are prepared at the start of first learning. The appearance inspection device sets the images as a first data set and performs learning using ones of the product images included in the first data set as a combination. A learning model generated in this phase is used as a first trained model to classify an image of an inspection object. At the time of additional learning using a new data set (a data set with product images not included in the first trained model) after that, the appearance inspection device sets the first data set as a reference data set, creates combinations of product images, each including at least one image included in the new data set (a combination of an image included in the reference data set and an image included in the new data set and a combination of two images included in the new data set), and performs additional learning using the created combinations of images on the first trained model. Note that, at the time of further additional learning after that, the appearance inspection device brings together the new data set and the reference data set (the first data set) to create a second data set and performs the additional learning using the second data set as a reference data set. In this manner, learning is progressively performed.

The new data set includes, for example, an image of an inspection object, for which an incorrect classification result is estimated in classification of images of inspection objects using the first trained model, and some product images included in the first data set, for which labels are changed. If the new data set includes data which is a duplicate of data in the reference data set, the duplicate data is preferably excluded from the new data set. Note that, if the new data set includes data which is identical in image to but different in label from data in the reference data set, the appearance inspection device according to the present invention can resolve discrepancy in label between images by not using the data with the image included in the reference data set for the additional learning (excluding the data from the reference data set).

An appearance inspection device according to an aspect of the present invention is an appearance inspection device for inspecting data capable of being subjected to appearance inspection. The appearance inspection device includes: a reference data set storing section capable of storing a set of pieces of data, as reference data set, which has been used for learning in the past and each of which is given a label indicating normality or abnormality; a learning data set storing section capable of storing a set of pieces of data, as a learning data set, which is used for additional learning and each of which is given a label indicating normality or abnormality; a data combination creating section that creates at least one combination composed of first data which is normal data and second data which is data as an object to be compared with the first data, on the basis of the reference data set and the learning data set; and a machine learning device that learns classification of the second data as normal or abnormal for the combination of the first data and the second data created by the data combination creating section. The machine learning device includes a state observing section that observes the combination of the first data and the second data as a state variable representing a current state of an environment, a label data acquiring section that acquires a label given to the second data as label data, and a learning section that learns by associating the state variable with the label data. The data combination creating section creates each of the combinations such that at least one of the first data and the second data is a piece of data selected from the learning data set storing section.

An appearance inspection device according to another aspect of the present invention is an appearance inspection device for performing appearance inspection of a product as an inspection object. The appearance inspection device includes: a reference data set storing section capable of storing, as reference data set, a data set of product images which has been used for learning in the past and each of which is given a label indicating a normal product or a defective product; a learning data set storing section capable of storing, as learning data set, a data set of product images which is used for additional learning and each of which is given a label indicating a normal product or a defective product; a data combination creating section that creates at least one combination composed of a first image which is a normal product image and a second image which is a product image as an object to be compared with the first image, on the basis of the reference data set and the learning data set; and a machine learning device that learns classification of a product corresponding to the second image as normal or defective for the combination of the first image and the second image created by the data combination creating section. The machine learning device includes a state observing section that observes the combination of the first image and the second image as a state variable representing a current state of an environment, a label data acquiring section that acquires a label given to the second image as label data, and a learning section that learns by associating the state variable with the label data. The data combination creating section creates each of the combinations such that at least one of the first image and the second image is an image selected from the learning data set storing section.

The data combination creating section may remove a piece of data which is a duplicate of a piece of data in the reference data set from the learning data set.

The data combination creating section may remove a piece of data which includes a duplicate of an image in the learning data set from the reference data set.

The learning data set may include an image which is given a label on the basis of a result of classification estimation based on a past learning result.

The learning data set may include an image for which incorrect classification was once estimated based on the past learning result but which is given a correct label again.

The appearance inspection device may be configured to compare a result of classification estimation for a past trained model with a result of classification estimation for a trained model after additional learning and adopt one of the trained models which allows appearance inspection closer to a human sense.

An appearance inspection method according to an aspect of the present invention is a method for inspecting data capable of being subjected to appearance inspection. The appearance inspection method includes: a step of creating at least one combination composed of first data which is normal data and second data which is data as an object to be compared with the first data, on the basis of a reference data set and a learning data set, wherein the reference data set is a set of pieces of data which has been used for learning in the past and each of which is given a label indicating normality or abnormality, and the learning data set is a set of pieces of data which is used for additional learning and each of which is given a label indicating normality or abnormality; a step of observing the combination of the first data and the second data as a state variable representing a current state of an environment; a step of acquiring a label given to the second data as label data; and a step of learning by associating the state variable with the label data. The data combination creating step includes creating each of the combinations such that at least one of the first data and the second data is a piece of data selected from the learning data set.

An appearance inspection method according to an aspect of the present invention is a method for inspection of a product as an inspection object, The appearance inspection method includes: a step of creating at least one combination composed of a first image which is an image of the product that is normal and a second image which is an image of the product as an object to be compared with the first image, on the basis of a reference data set and a learning data set, wherein the reference data set is a data set of product images which has been used for learning in the past and each of which is given a label indicating a normal product or a defective product, and the learning data set is a data set of product images which is used for additional learning and each of which is given a label indicating a normal product or a defective product; a step of observing the combination of the first image and the second image as a state variable representing a current state of an environment; a step of acquiring a label given to the second image as label data; and a step of learning by associating the state variable with the label data. The image combination creating step includes creating each of the combinations such that at least one of the first image and the second image is an image selected from the learning data set.

In the case of the appearance inspection device of the present invention, in performing an additional learning, the learning completes in a shorter time than in a case where learning is performed from scratch using all data sets. More specifically, a data set that was used to create a learning model is stored in advance as a reference data set, and additional learning is performed using a combination of the reference data set and a new data set. This allows a significant reduction in the number of cycles necessary for learning.

BRIEF DESCRIPTION OF THE DRAWINGS

FIG. 3 is a diagram depicting an example of creation of an image combination by a data combination creating section at the time of new learning.

FIG. 4 is a diagram depicting an example of creation of an image combination by the data combination creating section at the time of additional learning.

FIG. 10 is a diagram for explaining a learning method for an appearance inspection device according to the present invention.

DETAILED DESCRIPTION OF THE PREFERRED EMBODIMENTS

Figure 1:
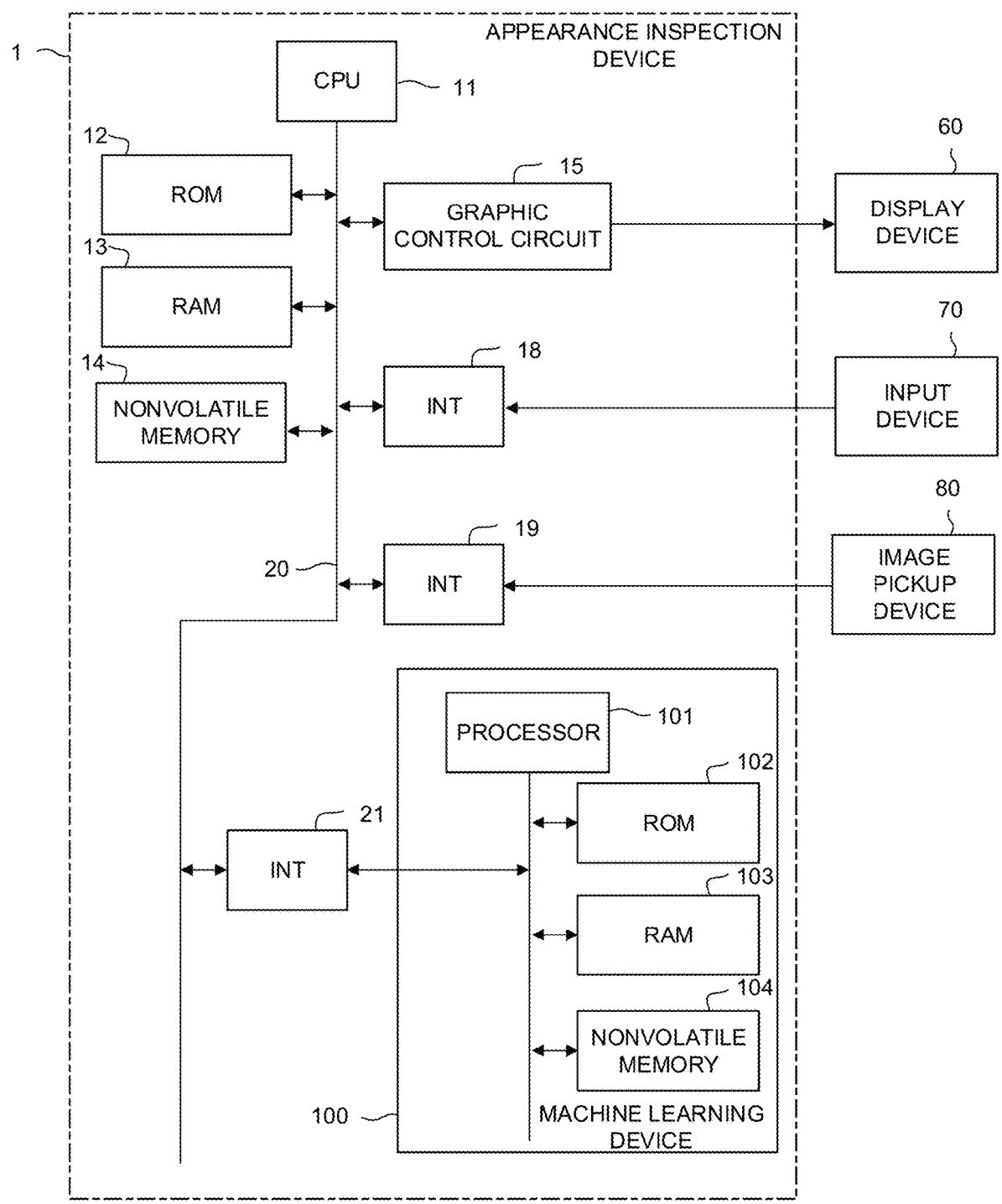
FIG. 1 is a schematic hardware configuration diagram of an appearance inspection device according to a first embodiment.

FIG. 1 is a schematic hardware configuration diagram depicting principal portions of an appearance inspection device according to a first embodiment.

A device which estimates classification of, for example, a product manufactured in a factory as a normal product or a defective product will be described as the appearance inspection device according to the present embodiment. A CPU 11 which an appearance inspection device 1 according to the present embodiment includes is a processor which performs overall control of the appearance inspection device 1. The CPU 11 reads out a system program which is stored in a ROM 12 via a bus 20 and controls the whole of the appearance inspection device 1 in accordance with the system program. Temporal calculation data and display data are temporarily stored in a RAM 13.

A nonvolatile memory 14 is configured as a memory whose storage state is held due to, for example, backing up by a battery (not shown) even when the power to the appearance inspection device 1 is turned off. The nonvolatile memory 14 stores therein data which is input from an input device 70, such as a keyboard, via an interface 18, image data of a product which is input from an image pickup device 80 via an interface 19, various types of data (including image data of a product) acquired via, for example, an external memory (not shown) or a network, and the like. A program and various types of data stored in the nonvolatile memory 14 may be loaded into the RAM 13 at the time of execution/use. Various system programs (including a system program for controlling interaction with a machine learning device 100 (to be described later)) are written in advance in the ROM 12.

A graphic control circuit 15 converts digital signals of numerical data, graphic data, and the like into raster signals for display and sends the raster signals to a display device 60. The display device 60 displays numerical values and graphics. A liquid crystal display device is principally used as the display device 60.

An interface 21 is an interface for connecting the appearance inspection device 1 and the machine learning device 100. The machine learning device 100 includes a processor 101 which controls the whole of the machine learning device 100, a ROM 102 which stores a system program and the like, a RAM 103 for temporary storage in each process associated with machine learning, and a nonvolatile memory 104 which is used to store a learning model and the like. The machine learning device 100 can observe pieces of data (for example, data of an appearance inspection object) acquirable by the appearance inspection device 1 via the interface 21. The appearance inspection device 1 also displays, on a display device (not shown) or the like, a result of inspection of an appearance inspection object which is output from the machine learning device 100.

Figure 2:
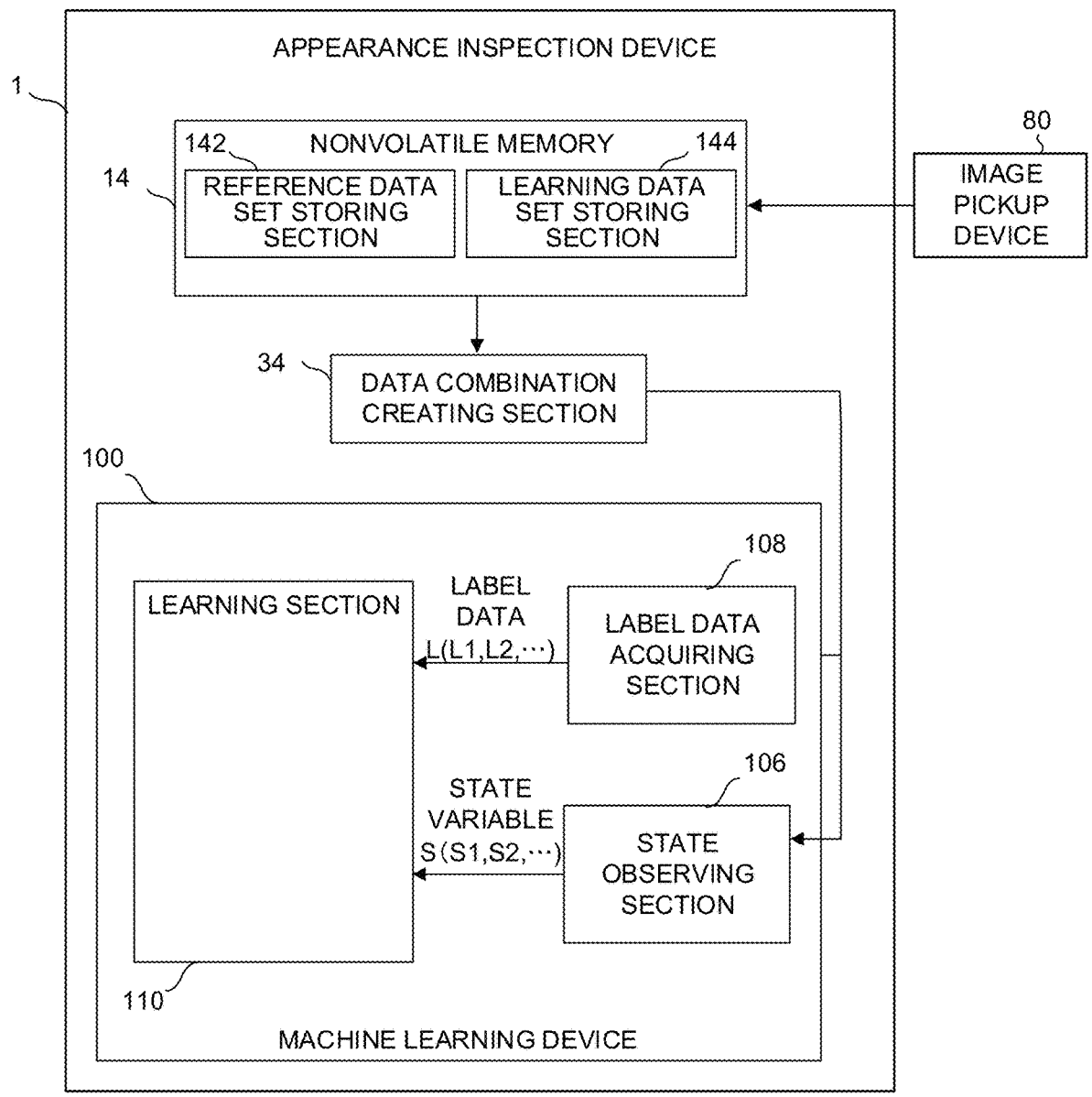
FIG. 2 is a schematic functional block diagram of the appearance inspection device according to the first embodiment.

FIG. 2 is a schematic functional block diagram of the appearance inspection device 1 and the machine learning device 100 according to the first embodiment.

Functional blocks depicted in FIG. 2 are implemented when the CPU 11 of the appearance inspection device 1 depicted in FIG. 1 and the processor 101 of the machine learning device 100 execute the respective system programs and control operation of sections of the appearance inspection device 1 and the machine learning device 100.

The appearance inspection device 1 according to the present embodiment includes a data combination creating section 34 which creates an image combination used for learning from a data set with product images which is stored in advance in the nonvolatile memory 14. A reference data set storing section 142 and a learning data set storing section 144 are reserved in the nonvolatile memory 14 of the appearance inspection device 1 according to the present embodiment. The reference data set storing section 142 is a region for storing a reference data set which is a set of images (images already given the label of normal product or defective product) of inspected products that was used for learning in the past. The learning data set storing section 144 is a region for storing a learning data set which is a set of images (images already given the label of normal product or defective product) of inspected products newly prepared for learning.

A reference data set to be stored in the reference data set storing section 142 is created by adding a learning data set stored in the learning data set storing section 144 to a reference data set stored in the reference data set storing section 142 at the completion of learning. A learning data set to be stored in the learning data set storing section 144 is created on the basis of, for example, a product image picked up by the image pickup device 80, a product image read from an external memory (not shown), a product image acquired via a network (not shown), and the like. Note that if new learning is started in a situation where any learning has never been performed yet, the learning is started with no reference data set stored.

The learning data set to be stored in the learning data set storing section 144 can be regarded as a data set to be used for additional learning. The learning data set may include a newly picked-up object image which is given the label of normal product or defective product or an image which is given a label on the basis of a result of classification estimation based on past learning results. Additionally, the learning data set may include an image, for which an erroneous result is output at the time of estimation of classification as a normal product or a defective product on the basis of existing learning results and which is given a correct label.

If new learning is started in a situation where any learning has never been performed yet (that is, with no image stored in the reference data set storing section 142), the data combination creating section 34 creates a combination of an image given the label of normal product and a different image (an image of a product as a comparison object) among images stored in the learning data set storing section 144. The data combination creating section 34 creates all image combinations that satisfy the above-described condition. For example, if image A (with the label of normal product), image B (with the label of defective product), image C (with the label of normal product), and image D (with the label of defective product) are stored as a learning data set in the learning data set storing section 144, as illustrated in FIG. 3, the data combination creating section 34 creates six image combinations.

On the other hand, if new learning is started in a situation where a learning has been once performed (that is, with images stored in the reference data set storing section 142), the data combination creating section 34 creates product image combinations, in which one product image combination includes at least one image stored in the learning data set storing section 144 (that is, including a combination of an image stored in the reference data set storing section 142 and an image stored in the learning data set storing section 144 and a combination of two images stored in the learning data set storing section 144), and further one product image combination includes at least one image that is given the label of normal product. The data combination creating section 34 creates all image combinations that satisfy the above-described condition. For example, if image A (with the label of normal product), image B (with the label of defective product), image C (with the label of normal product), and image D (with the label of defective product) are stored as a reference data set in the reference data set storing section 142, and image P (with the label of normal product), image Q (with the label of defective product), and image R (with the label of defective product) are stored as a learning data set in the learning data set storing section 144, as illustrated in FIG. 4, the data combination creating section 34 creates 12 image combinations. As described above, an image combination as an object to be learned is limited to a combination which includes at least one image selected from among the learning data set. This allows a significant reduction in the number of times learning is performed, as compared with a case where learning is performed using image combinations created from all the data sets lumped together.

The machine learning device 100 according to the present embodiment includes a piece of software (for example, a learning algorithm) and a piece of hardware (for example, the processor 101) for learning, for itself, a difference between a normal product and a normal product or defective product through so-called machine learning. What the machine learning device 100 that the appearance inspection device 1 includes learns corresponds to a model structure representing classification for a difference between an image of a normal product and an image of a product as a comparison object (a normal product or a defective product).

As indicated by the functional blocks in FIG. 2, the machine learning device 100 of the appearance inspection device 1 includes a state observing section 106, a label data acquiring section 108, and a learning section 110. The state observing section 106 observes a state variable S including normal product image data S1 indicating an image of a normal product and comparison image data S2 indicating an image of a product as an object to be compared with the normal product. The label data acquiring section 108 acquires label data L including classification data L1 indicating a label (normal product or defective product) for the image of the product as the comparison object. The learning section 110 learns classification for a difference between the image of the normal product and the image of the product as the comparison object (a normal product or a defective product) using the state variable S and the label data L.

An image of a normal product in an image combination created by the data combination creating section 34 is used as the normal product image data S1 of the state variable S to be observed by the state observing section 106. An image of a product as a comparison object in the image combination created by the data combination creating section 34 is used as the comparison image data S2 of the state variable S.

A label given to the image of the product as the comparison object in the image combination created by the data combination creating section 34 is used as the classification data L1 included in the label data L to be acquired by the label data acquiring section 108. The label data L to be acquired by the label data acquiring section 108 is an indicator of classification for a difference between the image of the normal product and the image of the product as the comparison object (a normal product or a defective product).

The learning section 110 learns estimation of classification (the label data L) for a difference between an image of a normal product and an image of a product as a comparison object (a normal product or a defective product) in accordance with an arbitrary learning algorithm generically called machine learning. The learning section 110 can repeatedly execute learning based on a data set including the state variable S and the label data L described earlier.

By repeating such a learning cycle, the learning section 110 can automatically identify features which imply classification as to whether to judge a product as a comparison object as a normal product or a defective product for a difference between an image (the normal product image data S1) of a normal product and an image (the comparison image data S2) of the product as the comparison object. At the start of the learning algorithm, classification of a product as a comparison object for a combination of the normal product image data S1 and the comparison image data S2 is substantially unknown; however, the learning section 110 gradually identifies features and interprets estimation of classification with the progress of learning. When estimation of classification of a product as a comparison object for the normal product image data S1 and the comparison image data S2 is interpreted to a level which is reliable to some extent, the learning section 110 that repeatedly outputs a learning result can estimate classification of an inspection object with high accuracy for an input image of a normal product and an input image of the inspection object.

In the machine learning device 100 having the above-described configuration, the learning algorithm that is executed by the learning section 110 is not limited to a particular learning algorithm, and a publicly known learning algorithm can be adopted as machine learning.

Figure 5:
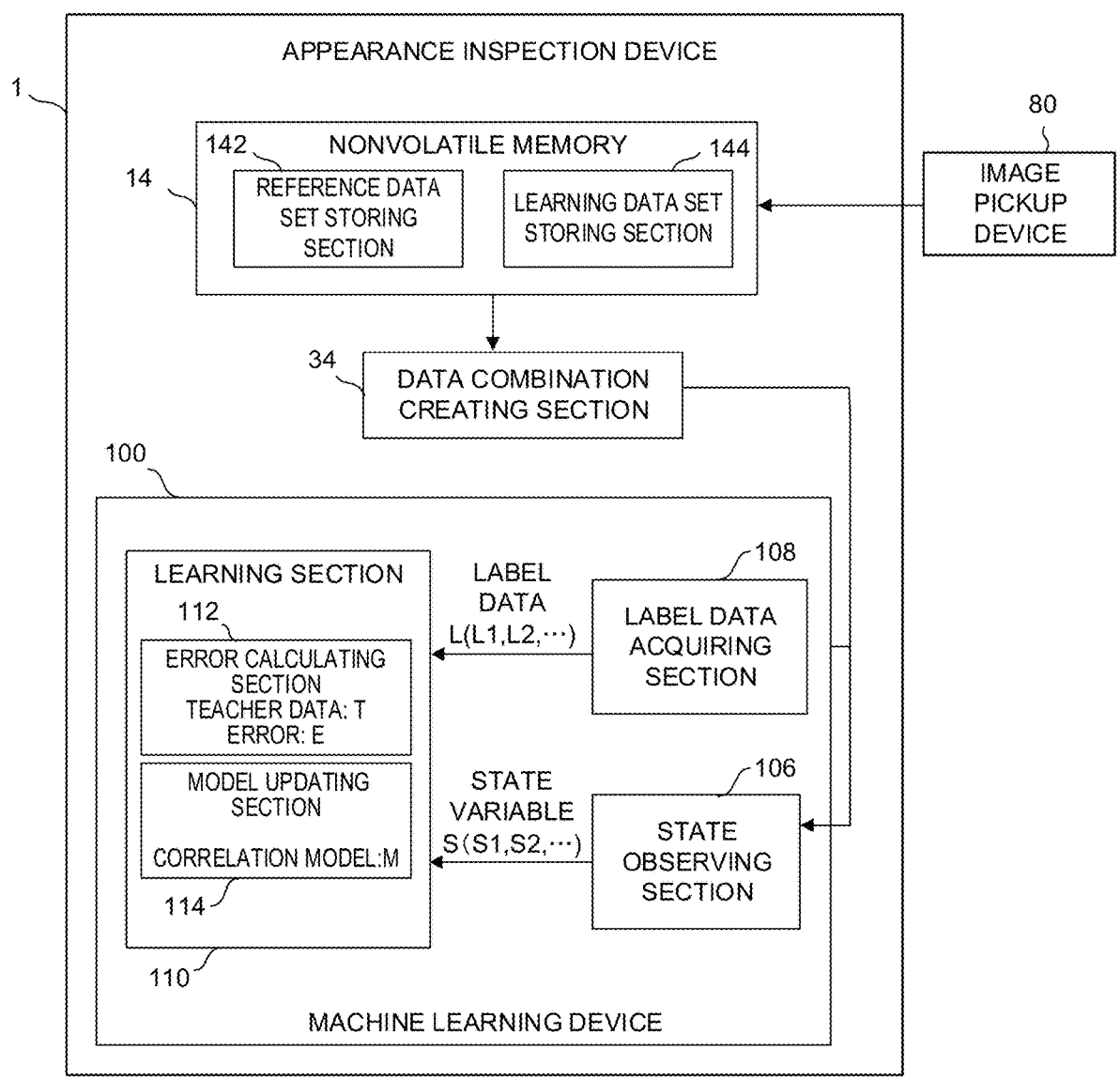
FIG. 5 is a schematic functional block diagram depicting one form of the appearance inspection device.

FIG. 5 depicts a different form of the appearance inspection device 1 depicted in FIG. 2 and a configuration including the learning section 110 that executes supervised learning as a different example of the learning algorithm. Supervised learning is a technique for learning a correlation model for estimating a necessary output for a new input by being provided with known data sets of inputs and corresponding outputs (referred to as teacher data) and identifying features which imply a correlation between an input and an output from the teacher data.

In the machine learning device 100 of the appearance inspection device 1 depicted in FIG. 5, the learning section 110 includes an error calculating section 112 and a model updating section 114. The error calculating section 112 calculates an error E between a correlation model M for estimating classification of an inspection object from the state variable S and a correlation feature which is identified from teacher data T prepared in advance. The model updating section 114 updates the correlation model M so as to reduce the error E. The learning section 110 learns estimation of classification of an inspection object for an image of a normal product and an image of the inspection object that are input by the model updating section 114 repeating update of the correlation model M.

An initial value of the correlation model M is, for example, a simplified expression (for example, as a linear function) of a correlation among the state variable S, a difference between an input image of a normal product and an input image of an inspection object, the label data L, and input classification of the inspection object and is provided to the learning section 110 before the start of supervised learning. The teacher data T can be constructed with, for example, empirical values accumulated by recording labels given through annotation work on (images of) past inspection objects and is provided to the learning section 110 before the start of supervised learning. The error calculating section 112 identifies a correlation feature which implies a correlation between a difference between an image of a normal product and an image of an inspection object and classification of the inspection object from the teacher data T provided to the learning section 110 and determines the error E between the correlation feature and the correlation model M corresponding to the state variable S and the label data L in a current state. The model updating section 114 updates the correlation model M so as to reduce the error E in accordance with, for example, a predetermined update rule.

In a next learning cycle, the error calculating section 112 determines the error E between an estimation result classification of an inspection object using the state variable S in accordance with the updated correlation model M and the actually acquired label data L. The model updating section 114 updates the correlation model M again. In this manner, a previously unknown correlation between a current state of an environment and classification corresponding thereto gradually becomes clear.

Figure 6A:
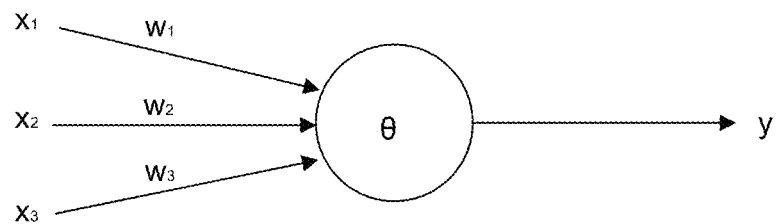
FIG. 6A is a diagram explaining a neuron.
Figure 6B:
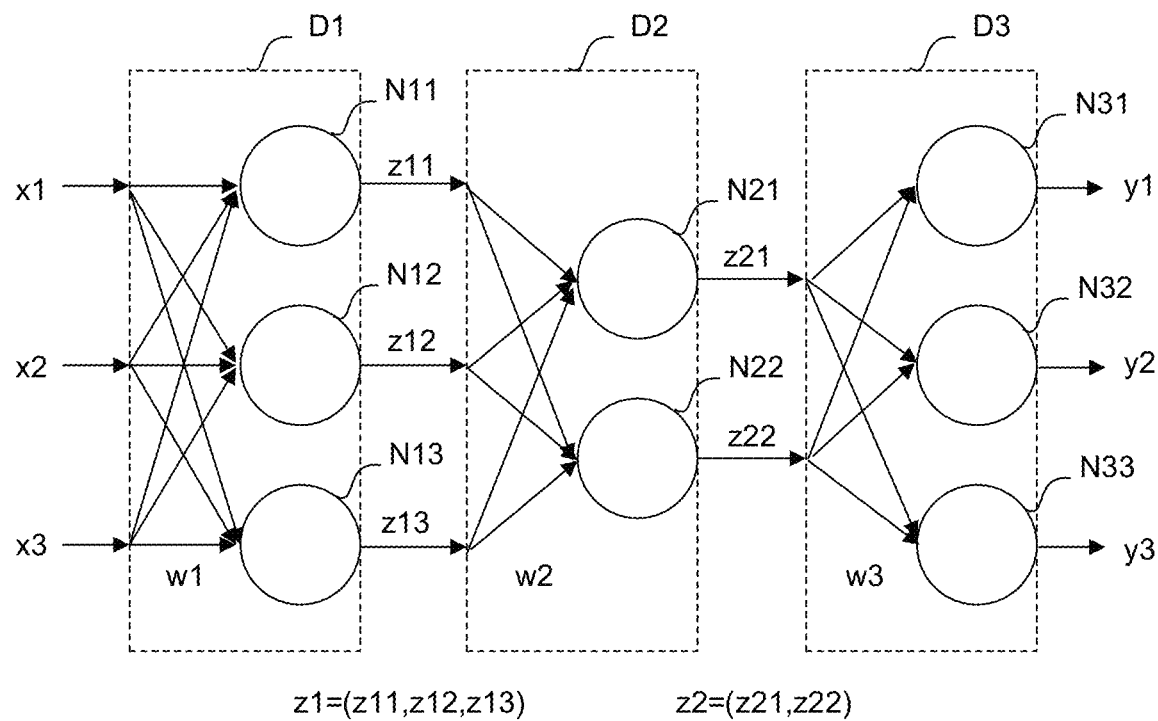
FIG. 6B is a diagram explaining a neural network.

When the above-described supervised learning is advanced, a neural network can be used. FIG. 6A schematically depicts a model of a neuron. FIG. 6B schematically depicts a model of a three-layer neural network configured by combining the neurons depicted in FIG. 6A. The neural network can be configured by, for example, a calculation device, storage, or the like which imitates the model of the neuron.

The neuron depicted in FIG. 6A outputs a result y of a plurality of inputs x (here, for example, inputs $x_1$ to $x_3$). The inputs $x_1$ to $x_3$ are multiplied by weights w ($x_1$ to $x_3$) corresponding to these inputs x. As a result, the neuron outputs the result y expressed by Formula 1 given below. In Formula 1, all of the input x, the result y, and the weight w are vectors. Moreover, θ is a bias and $f_k$ is an activating function.

$$y = f_k(\Sigma_{i=1}^{n} x_i w_i - \theta) \quad (1)$$

A plurality of inputs x (here, for example, inputs x1, x2, and x3) are input to the three-layer neural network depicted in FIG. 6B from the left side thereof, and results y (here, for example, results y1, y2, and y3) are output from the right side thereof. In an example depicted in FIG. 6B, each of the inputs x1, x2, and x3 is multiplied by a corresponding weight (generically expressed as w1) and each of the inputs x1, x2, and x3 is input to three neurons N11, N12, and N13.

The outputs of the neurons N11 to N13 are generically expressed as z1. The output z1 can be regarded as a feature vector which is the extracted feature amount of an input vector. In the example depicted in FIG. 6B, each of the feature vectors z1 is multiplied by a corresponding weight (generically expressed as w2), and each of the feature vectors z1 is input to two neurons N21 and N22. The feature vector z1 indicates a feature between the weight w1 and the weight w2.

The outputs of the neurons N21 and N22 are generically expressed as z2. The output z2 can be regarded as a feature vector which is the extracted feature amount of the feature vector z1. In the example depicted in FIG. 6B, each of the feature vectors z2 is multiplied by a corresponding weight (generically expressed as w3), and each of the feature vectors z2 is input to three neurons N31, N32, and N33. The feature vector z2 indicates a feature between the weight w2 and the weight w3. Finally, the neurons N31 to N33 respectively output the results y1 to y3.

Note that a so-called publicly known deep learning method using a neural network in three or more layers can also be used and that the learning section 110 that the machine learning device 100 according to the present embodiment includes can obtain a favorable result especially by using a deep learning method. The machine learning device 100 of the appearance inspection device 1 can output how classification of an inspection object is estimated for an image of a normal product and an image of the inspection object (the result y) as a result of performing computation in a multi-layer structure in accordance with the above-described neural network using the state variable S as the input x by the learning section 110. Note that operation modes of the neural network include a learning mode and a value prediction mode. For example, the weight w can be learned using a learning data set in the learning mode, and the value of an action can be judged using the learned weight w in the value prediction mode. Note that detection, classification, estimation, and the like can also be performed in the value prediction mode.

The above-described configuration of the appearance inspection device 1 can be described as a machine learning method (or a piece of software) which is executed by the CPU 11 of the appearance inspection device 1 or the processor 101 of the machine learning device 100. This machine learning method is a machine learning method for an appearance inspection device which performs appearance inspection of a product and includes a step in which the processor 101 observes pieces of data, such as the normal product image data S1 and the comparison image data S2, as the state variable S representing the current state, a step in which the processor 101 acquires the label data L indicating classification of an inspection object, and a step in which the processor 101 learns by associating the normal product image data S1 and the comparison image data S2 with classification of the inspection object using the state variable S and the label data L.

Figure 7:
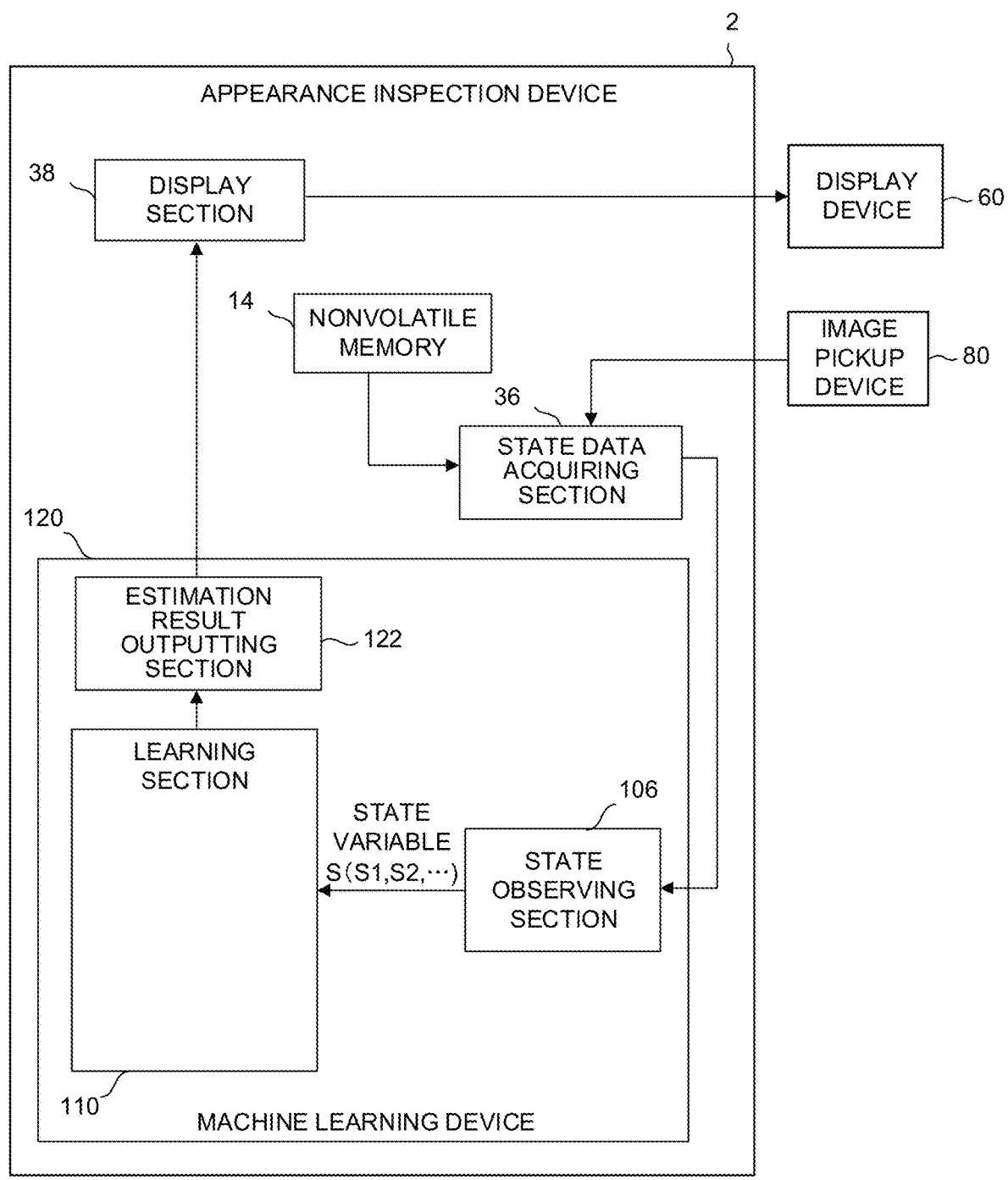
FIG. 7 is a schematic functional block diagram of an appearance inspection device according to a second embodiment.

FIG. 7 depicts an appearance inspection device 2 according to a second embodiment.

Functional blocks depicted in FIG. 7 are implemented when a CPU as depicted in FIG. 1 which the appearance inspection device includes and a processor as depicted in FIG. 1 of a machine learning device execute respective system programs and control operation of sections of the appearance inspection device and the machine learning device.

The appearance inspection device 2 according to the present embodiment includes a machine learning device 120, a state data acquiring section 36, and a display section 38. The state data acquiring section 36 creates a combination of an image of a normal product stored in advance in a nonvolatile memory 14 and an image of an inspection object acquired from an image pickup device 80. The display section 38 displays, on a display device 60, a result of estimating classification of the inspection object output from an estimation result outputting section 122 (to be described later). The state data acquiring section 36 outputs, as state data, the created combination of the image of the normal product and the image of the inspection object to a state observing section 106.

The estimation result outputting section 122 that the machine learning device 120 includes generates a result of estimating classification of the inspection object using a result of learning by the learning section 110 and outputs the classification as the generated estimation result.

The machine learning device 120 of the appearance inspection device 2 having the above-described configuration achieves the same effects as those of the machine learning device 100 described earlier.

Figure 8:
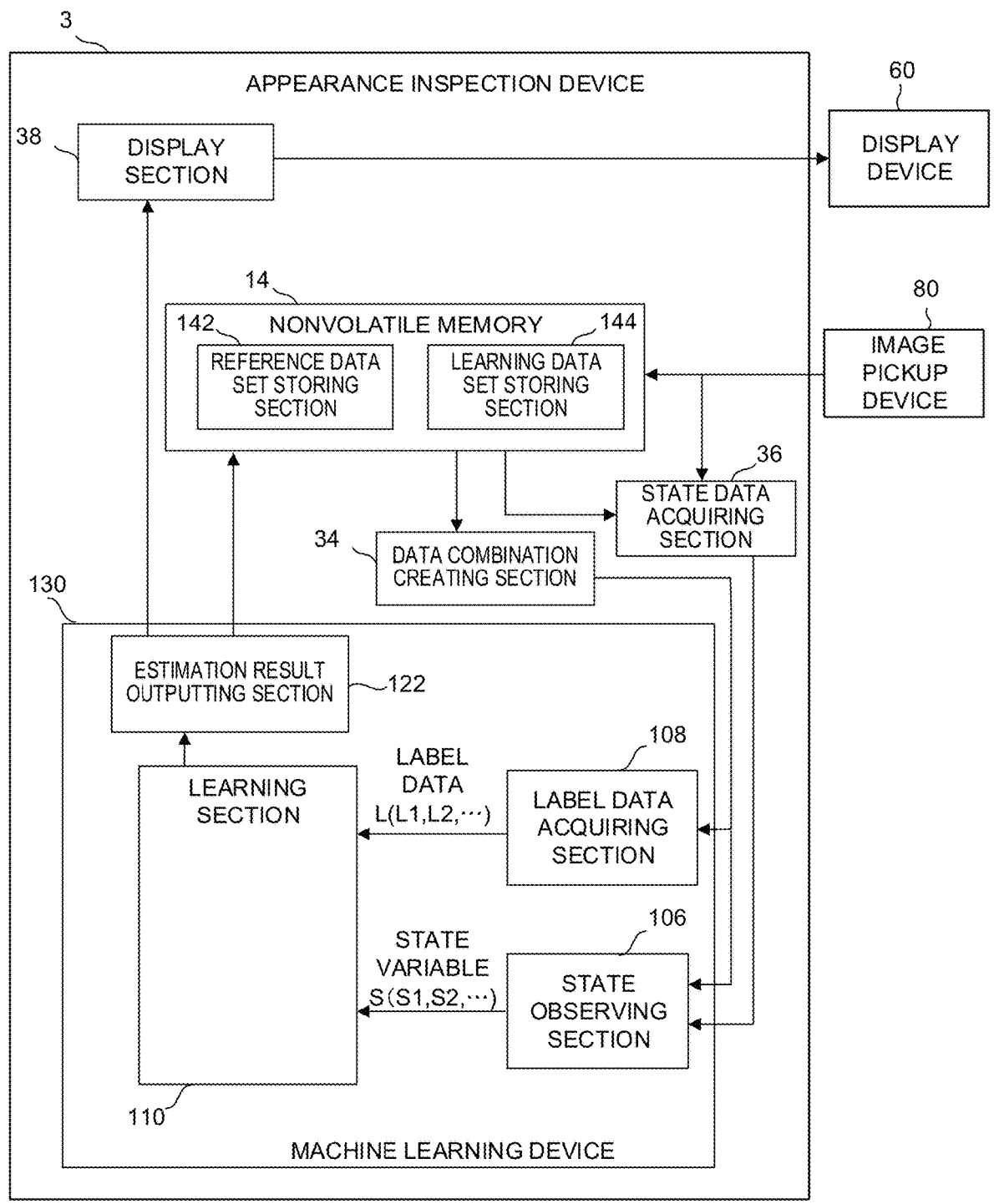
FIG. 8 is a schematic functional block diagram of an appearance inspection device according to a third embodiment.
Figure 9:
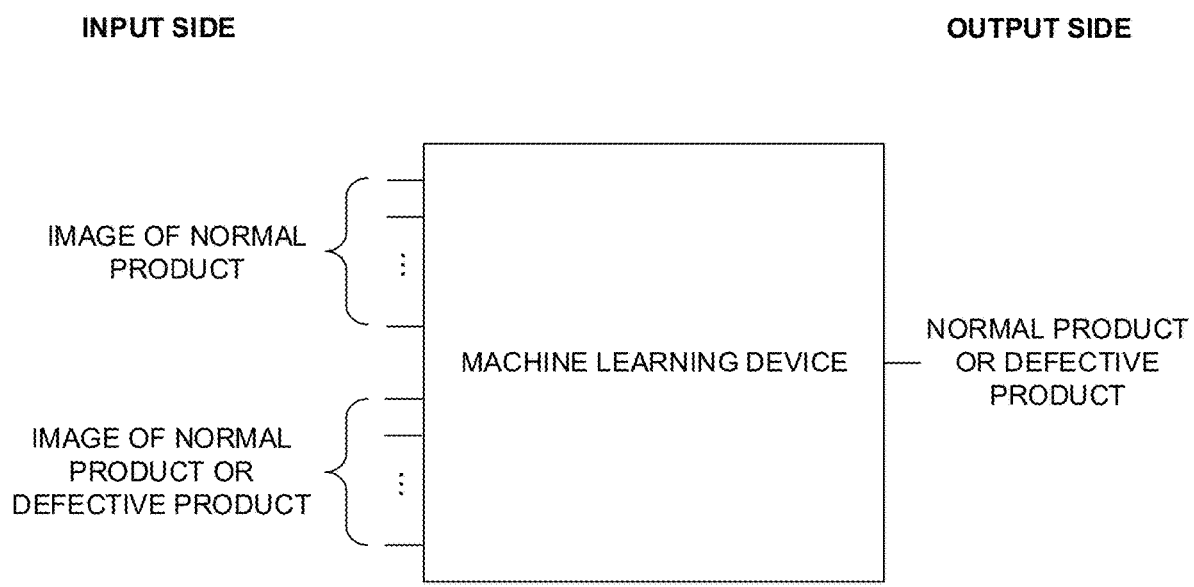
FIG. 9 is a diagram of a machine learning device which simultaneously receives input images of two inspected products and performs learning.

FIG. 8 depicts an appearance inspection device 3 according to a third embodiment.

Functional blocks depicted in FIG. 8 are implemented when a CPU as depicted in FIG. 1 which the appearance inspection device includes and a processor as depicted in FIG. 1 of a machine learning device execute respective system programs and control operation of sections of the appearance inspection device and the machine learning device.

Like the second embodiment described earlier, in the appearance inspection device 3 according to the present embodiment, an estimation result outputting section 122 generates a result of estimating classification of an inspection object using a result of learning by a learning section 110, on the basis of a data combination which is created by a state data acquiring section 36 from an image of a normal product stored in advance in a nonvolatile memory 14 and an image of the inspection object acquired from an image pickup device 80, and a display section 38 displays the classification as the generated estimation result on a display device 60. The appearance inspection device 3 adds the estimation result output by the estimation result outputting section 122 and the image of the inspection object to a learning data set storing section 144 and executes additional learning by the learning section 110 using a reference data set stored in a reference data set storing section 142 and a learning data set stored in the learning data set storing section 144 with predetermined timing.

Since a result of estimating classification as a normal product or a defective product on the basis of an existing learning result can be used as a data set for additional learning in the appearance inspection device 3 according to the present embodiment, good additional learning using a good data set can be performed at the time of, for example, handling a new defect mode.

A trained model obtained as a result of learning by the learning section 110 of a machine learning device 130 can be used as a program module which is a part of a piece of software associated with machine learning. A trained model according to the present invention can be used in a computer including a processor, such as a CPU or a GPU, and a memory. More specifically, the processor of the computer performs computation using, as inputs, an image of a normal product and an image of an inspection object in accordance with an instruction from a trained model stored in the memory and operates to output a result of estimating classification of the inspection object on the basis of a result of the computation. The trained model according to the present invention can be copied to a different computer via an external storage medium, a network, or the like and used in the different computer.

At the time of copying a trained model according to the present invention to the different computer and using the trained model in a new environment, the trained model can also be made to perform further learning on the basis of a new state variable and new determination data obtained in the environment. In this case, a trained model (hereinafter referred to as a derived model) derived from the trained model in the new environment can be obtained. The derived model according to the present invention is the same as the original trained model in outputting a result of estimation of classification of an inspection object for an image of a predetermined normal product and an image of the inspection object but is different from the original trained model in outputting a result more adapted to the new environment (for example, a new type of appearance inspection object). The derived model can also be copied to a different computer via an external storage medium, a network, or the like and used in the different computer.

It is further possible to create a trained model (hereinafter referred to as a distilled model) obtained by performing learning from scratch in a different machine learning device using an output obtained as a result of an input to a machine learning device incorporating a trained model according to the present invention and use the trained model (such a learning process is called distillation). In the distillation, the original trained model is also called a teacher model, and the newly created distilled model is also called a student model. Generally, a distilled model is smaller in size than an original trained model but can provide the same level of accuracy as the original trained model. The distilled model is thus suitable for distribution to a different computer via an external storage medium, a network, or the like.

While the embodiments of the present invention have been described, the present invention is not limited only to the examples of the embodiments described above and can be carried out in various modes by being changed as appropriate.

For example, a learning algorithm or a computation algorithm to be executed by the machine learning device 100 is not limited to the above-described one, and various algorithms may be adopted.

Although the appearance inspection device 1 (or 2) and the machine learning device 100 (or 120) have been described as devices having different CPUs in the above embodiments, the machine learning device 100 (or 120) may be implemented by the CPU 11 of the appearance inspection device 1 (or 2) and a system program stored in the ROM 12.

In the embodiments described above, the machine learning device 100 (or 120) is on the appearance inspection device 1 (or 2), but the machine learning device 100 (or 120) may be configured to be present on a cloud server or the like prepared in a network.

In the embodiments described above, the data combination creating section 34 performs learning by using all learning data sets stored in the learning data set storing section 144. However, if an image which is identical or similar to any one of images included in a learning data set stored in the learning data set storing section 144 and is given a label identical to that of the image is included in a reference data set stored in the reference data set storing section 142, the data combination creating section 34 may regard such an image as redundant and remove the image from the learning data set.

If an image which is identical or similar to any one of images included in the learning data set stored in the learning data set storing section 144 and is given a label different from that of the image is included in the reference data set stored in the reference data set storing section 142, the data combination creating section 34 may remove such data from the reference data set storing section 142 and may not use the data for additional learning.

In the embodiments described above, a result (a past trained model) of learning by the learning section 110 based on a reference data set is replaced with a trained model after additional learning based on a learning data set, but the learning section 110 may be provided with a function of temporarily retaining a past trained model in a memory or the like before performing an additional learning, a result of estimation of classification as a normal product or a defective product based on the past trained model may be compared with one based on a trained model after the additional learning, and one of the trained models which allows more correct appearance inspection may be used. In this case, the data combination creating section 34 may select a plurality of pieces of product image data as samples from among images included in a reference data set and a learning data set and create image combinations, execute estimation of classification of the sample images using each of the trained models, and adopt one of the trained models which outputs classification closer to human senses (for example, a worker is made to view the pieces of image data as the samples and input). If the past trained model outputs classification closer to human senses, since the learning data set used for the additional learning is not suitable as pieces of data used for learning, additional learning may be performed again after photographic conditions and the like for images used as a learning data set are reviewed.

In the above embodiments described above, the appearance inspection device 1 estimates classification of a product manufactured in a factory or the like as a normal product or a defective product, but the present invention may be applied to inspection of an object which can be determined to be normal or abnormal by appearance of the object, such as inspection based on a three-dimensional image of a product or the like, inspection of a waveform of sound, light, current, or the like measured by a sensor or the like, or inspection of a component distribution. In any case, the technique can be used as a technique for additional learning in a machine learning device which simultaneously receives two input pieces of normal/abnormal inspected data and performs learning/estimation.

The invention claimed is:

1. An appearance inspection device for performing inspection on a basis of data on appearance, the appearance inspection device comprising:
   a memory configured to store
      a set of pieces of data, as a reference data set, which has been used for learning in the past and each of which is given a label indicating normality or abnormality, and
      a set of pieces of data, as a learning data set, which is used for additional learning and each of which is given a label indicating normality or abnormality; and
   a processor configured to
      create, on a basis of the reference data set and the learning data set, a combination including
         first data, which is normal data (i) included in at least one of the reference data set or the learning data set and (ii) given the label indicating the normality, wherein the normal data excludes data (a) included in at least one of the reference data set or the learning data set and (b) given the label indicating the abnormality, and
         second data, which is data as an object to be compared with the first data, and
      perform machine learning to learn classification of the second data as normal or abnormal for the combination of the first data and the second data, wherein, in the machine learning, the processor is configured to
         observe the combination of the first data and the second data as a state variable representing a current state of an environment,
         acquire a label given to the second data as label data, and
         learn by associating the state variable with the label data, wherein
      the processor is configured to create the combination such that at least one of the first data or the second data is a piece of data selected from the learning data set.

2. An appearance inspection device for performing appearance inspection of a product as an inspection object, the appearance inspection device comprising:
   a memory configured to store
      as a reference data set, a data set of product images which has been used for learning in the past and each of which is given a label indicating a normal product or a defective product, and
      as a learning data set, a data set of product images which is used for additional learning and each of which is given a label indicating a normal product or a defective product; and
   a processor configured to
      create, on a basis of the reference data set and the learning data set, a combination including
         a first image, which is a normal product image (i) included in at least one of the reference data set or the learning data set and (ii) given the label indicating the normal product, wherein the normal product image excludes a product image (a) included in at least one of the reference data set or the learning data set and (b) given the label indicating the defective product, and
         a second image, which is a product image as an object to be compared with the first image, and
      perform machine learning to learn classification of a product corresponding to the second image as normal or defective for the combination of the first image and the second image, wherein, in the machine learning, the processor is configured to observe the combination of the first image and the second image as a state variable representing a current state of an environment, acquire a label given to the second image as label data, and learn by associating the state variable with the label data, wherein the processor is configured to create the combination such that at least one of the first image or the second image is a product image selected from the learning data set.

3. The appearance inspection device according to claim 2, wherein the processor is configured to remove a piece of data, which is a duplicate of a piece of data in the reference data set, from the learning data set.

4. The appearance inspection device according to claim 2, wherein the processor is configured to remove a piece of data, which includes a duplicate of an image in the learning data set, from the reference data set.

5. The appearance inspection device according to claim 2, wherein the learning data set includes an image which is given a label on a basis of a result of classification estimation based on a past learning result.

6. The appearance inspection device according to claim 2, wherein the learning data set includes an image for which incorrect classification was once estimated based on a past learning result but which is given a correct label again.

7. The appearance inspection device according to claim 2, wherein the processor is configured to compare a result of classification estimation for a past trained model with a result of classification estimation for a trained model after additional learning, and adopt one of the trained models which allows appearance inspection closer to a human sense.

8. An appearance inspection method of performing inspection on a basis of data on appearance, the appearance inspection method comprising:

creating, on a basis of a reference data set and a learning data set, a combination including first data and second data, wherein the reference data set is a set of pieces of data which has been used for learning in the past and each of which is given a label indicating normality or abnormality, the learning data set is a set of pieces of data which is used for additional learning and each of which is given a label indicating normality or abnormality, the first data is normal data (i) included in at least one of the reference data set or the learning data set and (ii) given the label indicating the normality, wherein the normal data excludes data (a) included in at least one of the reference data set or the learning data set and (b) given the label indicating the abnormality, and the second data is data as an object to be compared with the first data;

observing the combination of the first data and the second data as a state variable representing a current state of an environment;

acquiring a label given to the second data as label data; and learning by associating the state variable with the label data, wherein the creating includes creating the combination such that at least one of the first data or the second data is a piece of data selected from the learning data set.

9. An appearance inspection method of performing appearance inspection of a product as an inspection object, the appearance inspection method comprising:

creating, on a basis of a reference data set and a learning data set, a combination including a first image, and a second image, wherein the reference data set is a data set of product images which has been used for learning in the past and each of which is given a label indicating a normal product or a defective product, the learning data set is a data set of product images which is used for additional learning and each of which is given a label indicating a normal product or a defective product, the first image is a normal product image (i) included in at least one of the reference data set or the learning data set and (ii) given the label indicating the normal product, wherein the normal product image excludes a product image (a) included in at least one of the reference data set or the learning data set and (b) given the label indicating the defective product, and the second image is a product image as an object to be compared with the first image;

observing the combination of the first image and the second image as a state variable representing a current state of an environment;

acquiring a label given to the second image as label data; and learning by associating the state variable with the label data, wherein the creating includes creating the combination such that at least one of the first image or the second image is a product image selected from the learning data set.

* * * * *